July 17, 1956

T. W. JACKSON 2,755,061

COOLED TURBINE BLADE

Filed Jan. 23, 1953

INVENTOR
THOMAS W. JACKSON

BY

ATTORNEYS

United States Patent Office 2,755,061
Patented July 17, 1956

2,755,061

COOLED TURBINE BLADE

Thomas W. Jackson, Cincinnati, Ohio

Application January 23, 1953, Serial No. 333,022

2 Claims. (Cl. 253—39.15)

(Granted under Title 35, U. S. Code (1952), sec. 266)

The invention described herein may be manufactured and used by or for the Government of the United States of America for governmental purposes without the payment of any royalties thereon or therefor.

This invention relates to turbine blades with particular reference to blade cooling.

Turbine blades are constructed with consideration of the aerodynamic problems involved so that the efficiencies of the blade may be maintained at a high value. To this end, the leading blade edge is rounded and the trailing blade edge is tapered to a thin edge which, in the highly heated turbine gases, may become easily overheated, resulting in rapid deterioration of the blade metal.

In prior attempts at meeting this problem the blade profile was distorted resulting in diminution of aerodynamic efficiency; or the egress of the coolant at the trailing edge was such as to improperly cool the trailing blade edge.

The primary object of the present invention, therefore is to provide structural blade arrangements for cooling adequately the trailing edge of the blade. Additional objects are the provision of means for cooling the trailing blade edge without appreciable interference or modification of the normal aerodynamic blade structure.

Figure 1:
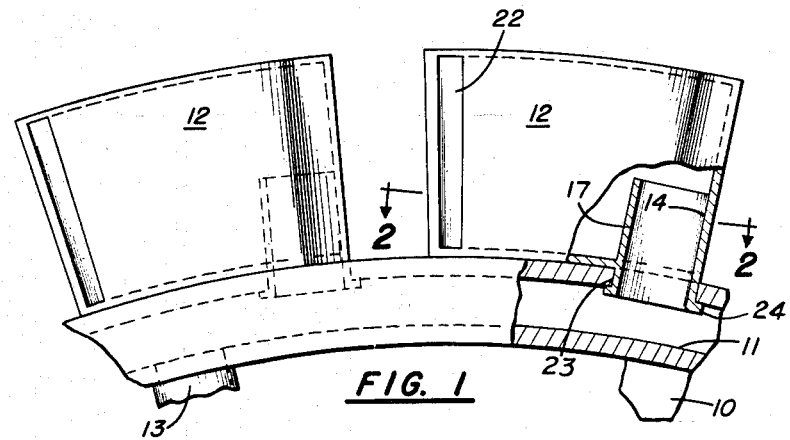
Figure 2:
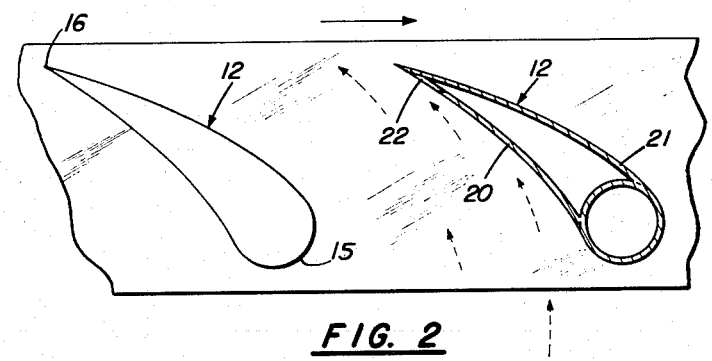

Other objects and many of the attendant advantages of this invention will be readily appreciated as the same becomes better understood by reference to the following detailed description when considered in connection with the accompanying drawings wherein:

Fig. 1 is an elevational view partly in section, showing a segment of a turbine drum with attached turbine blades; and Fig. 2 is a plan view of the showing of Fig. 1, with a sectional view of a turbine blade taken along lines 2—2 of Fig. 1.

The turbine rotor drum is indicated by numeral 10, there being provided in the periphery thereof an annular channel or manifold 11 for supply of pressurized coolant gas, such as air, to the blades 12. To this end the drum is hollowed and connected to an air supply under pressure, and, also tubes 13, from the drum interior to the manifold 11, and tubes or ducts 14, from the manifold to the hollow interior of each blade 12, are provided.

The blades 12 are hollowed, as appears from the section of Fig. 2, and the profile of the blade is aerodynamically designed for most efficient external air flow about the blade when in movement. Thus, the leading blade edge 15, assuming a rotor movement as indicated by the full line arrow of Fig. 2, is blunt and rounded, and from this edge the side walls 20 and 21 converge to a sharp tapered trailing blade edge 16. The side walls are preferably convex in the direction of blade movement, this construction not only being correct from the viewpoint of efficient design but also, as will later appear, aiding in the cooling action.

Each of the blade ducts is formed in part by the curved leading edge 15 of the blade and in part by a curved member 17 connected between the leading and trailing side walls 21 and 20 of the duct, the duct thus formed extending from a point about half of the radial blade length through an opening 23 formed in the exterior wall of the manifold 11. The duct end projecting within the manifold is lapped over the wall edge of the manifold opening 23, as shown at 24, to insure rigid attachment of the duct to the manifold.

At the extreme limiting edge of the trailing side plate 20, a radial edge slot 22 is formed along the major radial blade span, this slot constituting the exit for compressed air coolant. It is apparent that as the air emerges from the exit it is caught up by the main turbine air blast (see broken arrows of Fig. 2) and forced closely to the trailing edge of leading side plate 21. This produces a cooling film on the surface of the trailing edge which is augmented by the effect of the convex curvature of the side wall, this curvature causing a progressive increase in the air flow density within the blade from the trailing edge wall 20 to the leading blade wall 21. Thus, the trailing blade edge is cooled by the combined action of forced air convection and film cooling without interfering with the efficient aerodynamic structure of the blade.

It is pointed out also, that by the action of duct 14, cooling air is liberated about midway of the radial length of the blade leading edge, within the blade, and, since there is no obstruction in the blade chamber, the air tends to spread throughout the chamber space and flow through all sections of the outlet slot 22, thereby insuring uniformity in trailing edge cooling.

Other modifications and variations are possible in the light of the above teachings, and it is therefore to be understood that within the scope of the appended claims the invention may be practiced otherwise than as specifically described.

What is claimed is:

1. In gas turbines, a rotatable drum including a gas manifold formed in the periphery of said drum, said manifold having an opening in the exterior wall thereof, a radial blade extending from and attached angularly to said drum, said blade having leading and trailing sides, an enlarged leading edge, a tapered trailing edge and a coolant gas chamber therein formed by said leading edge and said leading and trailing sides, said blade being closed at its outer end, and a duct connecting said blade chamber and drum manifold, said duct being formed by the inner face of said leading edge, and a member spaced from but more nearly adjacent said leading edge than said trailing edge, said member being connected to said leading and trailing sides, said leading edge of said blade and said member projecting into said manifold through said opening in said manifold, the trailing blade side being continuously slotted adjacent and parallel to the trailing blade edge with the trailing slot edge coinciding with the extreme limit of the trailing blade edge, and the slot opening into said chamber, said leading blade side being convexly curved in the direction of blade rotation and said duct being singular and extending into said chamber a distance approximately one-half the radial length of the blade chamber.

2. The blade cooling apparatus for gas turbines as defined in claim 1 with the manifold end of said duct overlapping the edge of the opening in the exterior wall of said manifold.

References Cited in the file of this patent

UNITED STATES PATENTS

| 2,410,259 | Birmann | Oct. 29, 1946 |
| 2,568,726 | Franz | Sept. 25, 1951 |
| 2,647,368 | Triebbnigg | Aug. 4, 1953 |

FOREIGN PATENTS

| 862,691 | Great Britain | Jan. 12, 1953 |
| 878,999 | France | Nov. 2, 1942 |